(12) United States Patent
Martin et al.

(10) Patent No.: US 9,121,704 B2
(45) Date of Patent: Sep. 1, 2015

(54) OPTICAL SURVEILLANCE SYSTEM FOR A SPACE SURVEY SYSTEM FOR MONITORING NEAR-EARTH SPACE HAVING A MATRIX OF TELESCOPES COUPLED TO IMAGE SENSORS

(75) Inventors: Bernard Martin, Pessac (FR); François Le Berre, Houilles (FR); Damien Caillau, Saint Medard en Jalles (FR); Louis Leveque, Cierrey (FR)

(73) Assignee: ASTRIUM, SAS, Paris (FR)

(*) Notice: Subject to any disclaimer, the term of this patent is extended or adjusted under 35 U.S.C. 154(b) by 410 days.

(21) Appl. No.: 13/809,773

(22) PCT Filed: Jul. 8, 2011

(86) PCT No.: PCT/EP2011/061569
§ 371 (c)(1),
(2), (4) Date: Mar. 28, 2013

(87) PCT Pub. No.: WO2012/007361
PCT Pub. Date: Jan. 19, 2012

(65) Prior Publication Data
US 2013/0264463 A1    Oct. 10, 2013

(30) Foreign Application Priority Data
Jul. 12, 2010 (FR) ...................... 10 55660

(51) Int. Cl.
*G01C 21/02* (2006.01)
*G01C 15/00* (2006.01)
(Continued)

(52) U.S. Cl.
CPC ............... *G01C 15/006* (2013.01); *B64G 3/00* (2013.01); *G02B 17/002* (2013.01); *G02B 23/06* (2013.01)

(58) Field of Classification Search
CPC ......... G01C 15/006; G01S 5/16; G01S 17/66; H04N 7/18; G01J 1/00
USPC ................ 250/203.6, 203.1, 221, 239, 206.2, 250/208.1; 348/135–144; 244/158.1–158.8, 244/172.5
See application file for complete search history.

(56) References Cited

U.S. PATENT DOCUMENTS 7,045,774 B2    5/2006    Wheeler et al.
7,105,791 B1    9/2006    Poller
(Continued)

FOREIGN PATENT DOCUMENTS

DE    10319491    2/2004
EP    1772761     4/2007

OTHER PUBLICATIONS

Grigory Beskin, Sergey Bondar, Sergey Karpov, Vladimi R Plokhotnichenko, Adriano Guarnieri, Corrado Bartoli Ni and Giuseppe Greco, : "Multi-objective transforming telescope for wide-field optical monitoring of the sky with high-temporal resolution", SPIE, PO Box 10 Bellingham WA 98227-0010 USA, vol. 7733, Jun. 27, 2010, XP040524859, DOI: 10.1117/12.858074. paragraphs [0001], [0002], [0003], [04.1], [04. 2]; figures 1,3,6; tables 1,2,3.

(Continued)

Primary Examiner — Que T Le
(74) Attorney, Agent, or Firm — Perman & Green, LLP (57) ABSTRACT

An optical system for surveillance systems for space surveillance systems includes at least one telescope with a field greater than or equal to 5° mounted on a mobile mount along two axes, and coupled with an image sensor, whose sensitivity is designed for an integration time of the order of magnitude of a hundred milliseconds.

13 Claims, 3 Drawing Sheets

(51) Int. Cl.
*B64G 3/00* (2006.01)
*G02B 17/00* (2006.01)
*G02B 23/06* (2006.01)

(56) References Cited

U.S. PATENT DOCUMENTS

| | | |
|---|---|---|
| 7,155,031 B2 | 12/2006 | Yanagisawa et al. |
| 7,319,556 B1 | 1/2008 | Ackermann et al. |
| 8,947,524 B2 * | 2/2015 | Altwaijry et al. ............. 348/135 |
| 2003/0202682 A1 | 10/2003 | Yanagisawa et al. |
| 2006/0110007 A1 | 5/2006 | Yanagisawa |
| 2007/0188610 A1 | 8/2007 | Micotto et al. |
| 2009/0009897 A1 | 1/2009 | Holota et al. |
| 2009/0015914 A1 | 1/2009 | Duncan et al. |
| 2009/0147238 A1 | 6/2009 | Markov et al. |

OTHER PUBLICATIONS

Roman Wawrzaszek et al.: "Possible Use of the 'Pi of the Sky' System in a Space Situationalawareness Program", Proc. of SPIE, vol. 7502,2009, XP040503893, DOI: 10.1117/12.838751 Abstract; 2. Selected Survey Systems figure 6.

You Zhao, Cunbo Fan, Xingwei Han, Chengzhi Liu, Zhenwei Li, Qingli Song and Xue Dong: "Design and development of optoelectronic detecting system for space debris", Proc. of SPIE, vol. 7156,2008, XP040491062, DOI: 10.1117/12.806890 1. Introduction: 2. Optical system; 5. Summary.

Thomas Schildknecht: "Optical surveys for space debris", The Astronomy and Astrophysics Review, Springer, Berlin, DE, vol. 14, No. 1, Jan. 9, 2007, pp. 41-111, XP019471557, ISSN: 1432-0754, DOI: DOI:10.1007/S00159-006-0003-9 section. 3; 3.3.3; 3.3.5figure 29; table 3.

International Search Report dated Sep. 15, 2011.

Fugate R Q: "The Starfire Optical Range 3.5-m Adaptive Optical Telescope", Proceedings of SPIE, SPIE, USA, vol. 4837, Jan. 1, 2003, pp. 934-943, XP002617666, ISSN: 0277-786X, 001: 001:10.1117/12.457972 the whole document.

International Search Report Application PCT/EP2011/061568 dated Jul. 28, 2011.

International Search Report Application PCT/EP2011/061570 dated Aug. 4, 2011.

Nicholas I Johnson: "U. S. Space Surveillance", Advances in Space Research, Pergamon, Oxford, GB, vol. 13, No. 8, Aug. 1, 1993, pp. 5-20, XP002617664, ISSN: 0273-1177, 001: DOI:10.1016/0273-1177(93)90563-Q [retrieved on Oct. 29, 2002] th.

Potter A E: "Ground-Based Optical Observations of Orbital Debris: A Review", Advances in Space Research, Pergamon, Oxford, GB, vol. 16, No. 11, Jan. 1, 1995, pp. 35-45, XP002617665, ISSN: 0273-1177, 001: 001:10.1016/0273-1177(95)98751-9.

* cited by examiner

OPTICAL SURVEILLANCE SYSTEM FOR A
SPACE SURVEY SYSTEM FOR MONITORING
NEAR-EARTH SPACE HAVING A MATRIX OF
TELESCOPES COUPLED TO IMAGE
SENSORS

CROSS-REFERENCE TO RELATED APPLICATIONS

This application is the National Stage of International Application No. PCT/EP2011/061569 International Filing date, 8 Jul. 2011, which designated the United States of America, and which International Application was published under PCT Article 21 (s) as WO Publication 2012/007361 A1 and which claims priority from, and benefit of, French Application No. 1055660 filed on 12 Jul. 2010, the disclosures of which are incorporated herein by reference in their entireties.

This application is related to U.S. patent application Ser. No. 13/809,763, entitled "METHOD FOR REALIZING A SPACE SURVEY SYSTEM FOR MONITORING NEAR-EARTH SPACE", filed on 11 Jan. 2013; and U.S. patent application Ser. No. 13/809,751, entitled "SPACE SURVEY SYSTEM FOR MONITORING NEAR-EARTH SPACE," filed on 11 Jan. 2013.

This disclosed embodiment relates to an optical survey system for a space survey system for monitoring Near-Earth space from the ground so as to detect objects present within this space, determine their precise trajectories and monitor these trajectories.

Such a system makes it possible to track the changes in the objects' trajectories and to catalog these objects and their trajectories.

BACKGROUND

Near-Earth space is defined as the portion of space located up to several hundred thousand Km from Earth. The detection therefore concerns objects that are primarily—but not only—in orbit around the Earth.

SUMMARY

These objects will be called debris in the rest of the text, bearing in mind that this notion of debris includes actual debris, operational satellites and even meteorites.

The disclosed embodiment is more specifically concerned with debris in Low Earth Orbit ("LEO") from 200 km to 2,000 km, whose numbers lead to an increasing risk of collisions that could, over the long term, bring about a worsening of the situation, and, above all, risks relating to operational aerospace means, irrespective of whether they are military, scientific or commercial.

In order to control these risks, it is essential to catalog all potentially hazardous debris and to associate valid orbital parameters to them, which make it possible to describe their trajectories.

Observed from a fixed point on Earth, objects in Low Earth orbit have the property of traveling quickly through the sky. In addition, at every moment multiple objects are crossing the sky in several places.

Depending on its orbital parameters, each object crosses the local sky at more or less regular time intervals, ranging from several tens of minutes to several hours.

The orbits are affected by various effects such as the tide, atmospheric drag, radiation pressure and irregularities in the Earth's gravitational field.

This prevents a precise long-term description of these orbits with an invariant set of orbital elements.

In addition, the distribution of debris sizes varies from a characteristic radius of several millimeters, e.g. propulsion or paint residue, to meteorites with several tens of meters, satellites or artificial orbital systems in particular, whether they are operational or not.

Monitoring the Low Earth orbit requires the following functions to be realized:
detect the low-orbit objects, without prior knowledge of their existence, or position;
define their trajectory or orbital parameters, with a suitable precision for the intended utilization;
update their known orbital parameters over time.

In addition, it is necessary to reacquire the same objects and to regularly refresh the measurements of their orbital parameters, so that their precision remains suitable for their intended utilization, e.g. to implement the processes of identifying and of consolidating collision risks.

Lastly, the system must be able to refine the precision of a given object's known orbital parameters upon request, so as to be able to accurately predict its position in the near future, typically several days, in order, for example, to consolidate a collision risk and to plan possible avoidance maneuvers.

The first three functions are traditionally grouped together under the space survey topic, which is the main subject of this disclosed embodiment, while the fourth belongs to the space tracking topic.

Realizing these survey functions requires having:
a wide field of view;
sensitivity that makes it possible to detect objects of interest;
sufficient accuracy precision in measuring the changes in objects crossing this field of view to estimate their orbital parameters with the required performance level.

The orbital parameters are estimated on the basis of a time series of measurements of the position/velocity vectors of the objects, acquired during their transit in the field of view.

U.S. Pat. No. 7,319,556 concerns a wide-field telescope, suitable for a system performing these functions.

The main techniques currently proposed and implemented to realize low-orbit monitoring are based on ground-based radar:
the "Space Fence" radar of the US DoD (Department of Defense);
the GRAVES radar implemented by the French Ministry of Defense (bistatic continuous wave phased array radar);
missile warning-type radar (monostatic pulsed phased array radar).

Even though they offer many advantages (wide field of view making it possible to capture areas of 180° in azimuth over several tens of degrees in elevation, simplified access to velocity information thanks to Doppler measurements, lack of sensitivity to the weather and the day/night cycle, etc.), the radar solutions have many drawbacks, residing mainly in their development, maintenance and operational costs, as well as in their ecological impact:
the frequencies used are high (L-band)
large-scale magnetic losses are generated,
tens of Megawatts of power are required, with low yields,
the mean time between failures (MTBF) of radars, as for any high power electrical equipment, is low and results in high maintenance costs,
the orbital population than can be accessed by each radar is dependent on its location on the globe; this leads to being placed in the equatorial zone, whose temperature and humidity conditions are severe for electrical and electronic components, thereby increasing operation and maintenance costs.

As an alternative, optical systems have already been considered to realize space surveys. Purely passive; their principle is based on detecting the sunlight reflected by natural or man-made objects in orbit around the Earth or beyond, e.g. asteroids and planetoids. Such systems provide access to time series of measurements of the objects' angular positions, e.g. their azimuth and elevation.

Various methods are used to measure these positions; the most advantageous of these relies on measuring the position of the detected objects at each instant in relation to the stars present in the field of view, stars whose position is known with very high accuracy.

The major benefits of optical systems over radar systems are their low development, production, operating and maintenance costs, their reliability and their simplicity of implementation.

In addition, since they are purely passive, they require little in the way of infrastructure, energy, buildings and means of transport.

Optical systems are normally used to monitor the GEO (geostationary orbit) or, more recently, the MEO (intermediate orbit between LEO and GEO), because objects at these orbits have the particularity of traveling very little in the sky; this facilitates the long observation times required to detect objects that are small and/or have a very low light intensity.

The US Air Force GEODSS is an operational example of such systems. It mainly comprises telescopes with an aperture of one meter or more with a narrow field of view, of the order of one degree.

Long integration (exposure) times ranging from 1 to several seconds can be used for these GEO and MEO applications, which allows the signal-to-noise ratio to be increased so as to detect small objects with a characteristic diameter of several tens of cm.

An example of multi-sensor realization is described in document US 2009/0147238.

Some studies have also been initiated to define solutions able to monitor the LEO.

For example the French experimental system SPOC ("Systeme Probatoire pour ('Observation du Ciel" [Sky Observation Test System]) included 4 small telescopes with an aperture of the order of 10 cm pointed towards the 4 cardinal points at an elevation of several tens of degrees, each offering a field of view of the order of 10°.

Other concepts propose sensitive catadioptric systems with an aperture of one meter or greater, called "wide field", of the order of 5°, dedicated to LEO monitoring, such as, for example, the system that is the subject of the aforementioned U.S. Pat. No. 7,319,556.

The solutions mentioned above and currently proposed do not however allow the fundamental difficulties and constraints linked to LEO monitoring to be resolved, i.e.:

the need for rapid (several days) detection of any new object, in particular to identify any fragmentation or explosion phenomenon in orbit, the need for frequent re-acquisition (every few days) of each object and the updating of its orbital parameters in order to maintain a usable precision of orbital parameters, particularly as regards the operational evaluation of collision risks, the detectability of the objects has interdependencies between the geographic location of the optical system and the orbits (the inclination in particular) of the objects, linked to their illumination conditions, optical observations are linked to local weather conditions (cloud cover).

Because of these constraints, LEO monitoring also requires specific optical system with very good sensitivity, excellent resolution and a wide field of view.

In effect, existing telescopes usually have high sensitivity, wide apertures and/or long integration times and high resolution, which are detrimental to a wide field of view, because they are designed for conventional astronomy applications or for surveying minor planets and asteroids: they are therefore not compatible with LEO surveying.

In addition, the very principle of surveying does not provide for tracking objects. As a result, during LEO observation, long integration periods do not improve the detectability of an object, which is evaluated in relation to the signal-to-noise ratio of each illuminated pixel, because, in the case of conventional integration (one second) the object traverses several pixels of the sensor (CCD sensor) over the integration period; this is disadvantageous for determining the position and date-stamping same, and it also includes noise, consequently degrading the signal-to-noise ratio once the pixel has been traversed.

From another point of view, the known solutions are not suited to the conditions of LEO detection and are therefore unable to provide observations of all the observable objects with a suitable revisit time.

Lastly, wide-field telescopes remain limited, as known in particular from document US 2009/009897 or document EP 1 772 761.

Other examples of telescopes are given in documents U.S. Pat. No. 7,045,774, US 2007/0188610 and US 2009/0015914.

In the light of this situation, the disclosed embodiment consists of realizing a ground-based LEO survey system that utilizes optical means distributed over the Earth's surface to detect these objects present in low orbit, <2,000 km, without knowing them beforehand and to provide an initial estimate of their orbital parameters.

The disclosed embodiment therefore aims to define a ground-based LEO survey system, based on purely passive optical solutions that, at a competitive cost compared to radar solutions (a factor of 2 to 10), provide comparable performance levels, as follows:

equivalent coverage of the object population in LEO, in terms of completeness, maximum detection period for a new object and maximum system revisit period for each cataloged object, i.e. typically a revisit period allowing 95% of objects larger than 10 cm to be detected;

equivalent precision in terms of reproduced and maintained orbit, of the order of 100 m and 2 m/s.

The disclosed embodiment thus relates to LEO tracking using optical technology and solutions for implementing such tracking.

To do this, the disclosed embodiment provides an optical system for a survey system for a space survey system characterized in that it comprises a matrix of N×P telescopes, each with a field greater than or equal to 5° and preferably greater than or equal to 10°, said telescopes being coupled to N×P image sensors whose sensitivity is suitable for integration times of the order of magnitude of 10 to 100 milliseconds, the telescopes being mounted on one or several motorized mounts, the telescopes being servo-controlled together and grouped so as to operate simultaneously to provide a wide field and in that the movement velocity of the telescope mounts is such that each object that traverses the area swept is detected at least three times to obtain at least 3 date-stamped position measurements distributed over the object's arc of transit in the area of the sky, the exposure time or integration time being defined to obtain the signal being spread over several pixels.

According to a first embodiment, said telescope is a TMA-type telescope.

According to a second embodiment, said telescope is a folded Schmidt-type telescope.

It has an aperture of f/1.6 with central shadow compensation.

Advantageously, said telescope comprises a field of 5°×5° to 12°×12° and preferably of 8°×8° to 12°×12°.

Preferably, the system comprises a matrix of N×P sensors associated with N×P telescopes.

Each telescope is advantageously mounted on a motorized mount.

The N×P mounts are preferably connected to common control means able to control these mounts together in azimuth and elevation.

According to a particular embodiment, the telescopes having a usable field of 10° by 10°, the system comprises N×P=3×2 i.e. 6 telescopes so as to provide a reconstituted field of 30° elevation by 20° azimuth.

Each telescope is preferably mounted on a programmable rotary mount designed to scan a global area of up to 60° elevation by 40° azimuth.

The movement speed of the telescope mounts is preferably such that each object traversing the area swept is detected three times to obtain at least 3 date-stamped position measurements distributed over the object's arc of transit in the area of sky.

Advantageously, the sensor of the telescope(s) is a CCD sensor with 1000×1000 to 6000×6000 pixels and a CCD read-out time less than or equal to 2 seconds and in that the exposure time is less than 100 milliseconds.

BRIEF DESCRIPTION OF THE DRAWINGS

Other features and advantages will become apparent in reading the following description of a non-limiting example of realization of the disclosed embodiment with reference to the drawings, which show.

DETAILED DESCRIPTION

In the context of the disclosed embodiment, in order to realize the grid a system configuration is defined, using computer-based means of simulating the performance and positions of optical systems, which system configuration consists of a suitable networking of ground-based optical systems along said grid or an approximation of said grid over the surface of the Globe or surface of the planet, to provide an effective daily cycle of the system close to 24 hours, i.e. continuous coverage of the planet's entire environment.

By calculating the phase angle (in astronomy, the phase angle is the angle made by the sun, the object observed and the observer or, more generally, the angle made by the incident light ray and the reflected ray) and the sun's position and by simulation, specific observation conditions (area to be covered, time of day, etc.) are defined for each optical system, depending on its geographical location, to provide each optical system with optimum illumination of the objects to be detected.

For the optical systems of the example, passive detectors are used that have a wide field, greater than 5° or preferably greater than 10°, and are designed to detect the objects in the scanned area.

For example, 70 cm reflecting telescopes able to detect 10 cm objects at a distance of 1,000 km are chosen.

The conditions for scanning areas of the sky by the optical systems are then optimized so as to cover the observation area 4 to 6 times faster than the transit speed of the objects to be detected.

As an example of realization, the grid is realized by simulation according to either one of the methods below or to a combination of these methods.

The steps common to both methods are:

preselecting a set of candidate sites, selected from accessible sites (presence of infrastructure such as access, electricity, communications and quality of sky favorable for optical observation) and on the basis of an analysis of the issue of visibility:

objects in a highly inclined orbit ([~80°; 120°]) better visibility at high latitudes (>50° N or S);

objects in a moderately inclined orbit (around 50°) better visibility at middle latitudes) (~45°);

objects in a low inclined orbit (<~30°) better visibility at latitudes near the tropics and subtropics;

selecting sites providing, as far as possible, a longitude spacing of around 20° or less by calculating the average longitudinal shift of the trace on the ground of the low orbits over two successive orbits (approximately 20°, which corresponds to the Earth's speed of rotation of 15° per hour—and the orbit period at 500 km, about 90 mins.)

using a computer simulation at least able to simulate the stations' observation strategy, the illumination conditions to be met so that the orbital objects are detectable, and the changes over time in the reference orbital population around the Earth (e.g., in non-limiting manner, the NORAD TLE catalog) taking at least the Earth-Sun interactions into account. For each object in the simulated population, at least the list of episodes of visibility over time is defined, i.e. the conditions under which the object is visible from a site according to the simulated observation strategy, expressed as follows: date of beginning of visibility; duration of visibility; identification of the site of visibility, evaluating for all visibility episodes whether they meet the detection conditions (minimum duration of visibility required for an initial determination of trajectory, depending on the object's orbit).

Starting with these common steps, method no. 1 comprises:

a simulation of the episodes of visibility across the entire reference population for all the predefined sites, over a simulation period making it possible to erase day/night and seasonal effects (typically from several days to several weeks in the summer and in the winter);

a search on the basis of the results of the minimum subset of stations ensuring that the targeted portion of objects (e.g. 98% of the reference population) can be cataloged in a minimum objective period (e.g. 1 month).

So they can be cataloged, the objects must be seen at least once by meeting the detection conditions within the allotted period and the minimum search can then be performed using a conventional minimum search algorithm.

Method no. 2 comprises a simulation of the visibility episodes for the entire reference population for a preferred subset of sites selected by analytical criteria (e.g. according to criteria of ease of access, specific properties of the site, etc.) and an assessment of the coverage rate, i.e. the percentage of the reference population visible at least once meeting the detection conditions, and also the convergence period, i.e. the simulated period of time required to achieve this level of coverage.

This simulation is completed by iteration, modifying the subset of preferred sites by adding or removing sites until the required performance is achieved, e.g. 98% coverage of the reference population, and a convergence period of, for example, 1 month.

For detecting objects, the disclosed embodiment provides a measurement of the position time series of the objects crossing the scanned areas by short integration over a fixed field, returning, in relation to the stars in the field of view, a minimum of 3 measurement points for each object crossing the scanned area.

The use of short integration times is one of the innovative elements of the disclosed embodiment.

In survey mode, objects cannot be tracked because their presence is not known beforehand. Images are therefore captured at a fixed pointing position during the exposure time (or integration period).

Thereafter, the sensitivity (ability to see a star or an orbital object relative to the background noise) is defined by the signal-to-noise ratio in each pixel, defined by the simplified formula:

$$SNR \cong \frac{Signal}{\sqrt{\sum Noises^2}}$$

With:

Signal=PhotonsFlux×TimeExposure $\Sigma Noises^2$=PhotonNoise$^2$+SkyBackgroundNoises$^2$+$\Sigma$ElectronicNoises$^2$ PhotonNoise=$\sqrt{Signal}$ SkyNoise=Skyphotonflux×TimeExposure The observation of distant stars is generally performed by compensating for the Earth's rotation so as to maintain a fixed sky in the field of view.

The star in question then illuminates a set of fixed pixels. In those circumstances, so as to increase the SNR (signal-to-noise ratio), it is sufficient to increase the exposure time so that, for an object with a given brightness, the signal dominates all the other noises, in particular the sky background noise.

The same situation prevails for the optical monitoring of the GEO: the objects therein are practically still relative to the axis of observation on the ground, and here also, the axis of observation is fixed in relation to the local reference and the increase in sensitivity is obtained by increasing the exposure time.

This explains why long exposure times (or integration time) are used traditionally, of the order of several seconds to several minutes.

In the context of low orbit surveying, the object is not still in relation to the axis of observation. Consequently, its image travels across the CCD. Each of the COD's pixels is only illuminated by the signal during the time the object's image is traveling over that pixel. In contrast, each pixel of the CCD is illuminated by the background noise over the entire exposure time.

Thus, according to this disclosed embodiment, in order to maximize the SNR, an exposure time is set that is close to the object's transit time in the field of the pixel. However in LEO, depending on the axis of observation (apparent angular velocity lower at low elevation than at zenith), the instrument's configuration (field of view, size of each pixel) and the object's orbit (angular velocity less at high altitude), this transit time is of the order of a few milliseconds to several hundred milliseconds.

Consequently, exposure times (or integration times) below one hundred milliseconds are selected, which make it possible to obtain the maximum possible signal-to-noise ratio.

The ideal exposure time is selected by calculating the photometric link budget, taking into consideration the favored orbits, the different observation configurations (elevation, phase angle, exposure time), the quality of the sky background, the effect of the atmosphere (signal attenuation and dilution by turbulence), the instrument's configuration (telescope and focal plane) and the characteristics of the targeted objects (minimum size and minimum albedo).

Basically, this consists of analyzing sensitivity to various parameters, making it possible to define the most suitable instrument configuration observation and configuration.

As the brightness of an object is directly related to its size and its ability to reflect the sunlight (albedo), the system's great sensitivity makes it possible to see small objects.

The images captured during the transit of objects are processed taking into account the positioning of the optical system by utilizing an image processing computer system to extract the date-stamped positions of objects crossing the field.

In addition, by adding a dedicated tracking system to each optical survey system, realized, for example, with a conventional field telescope system motorized and controlled by a computerized tracking system connected to the optical survey system's computer system, more numerous and precise position measurements are acquired, based on the designation realized by the survey system, making it possible to obtain the required precision for the determination of the objects' orbital parameters.

This makes it possible to transform the survey system into a tracking system, i.e. a system able to define and track a precise trajectory of previously detected objects.

The ground-based optical survey systems are networked over the surface of the Globe or of the planet by keeping to the following rules:
  preferred latitudes for the optical systems are defined, based on orbit types; in particular, the following are provided:
  optical systems close to the intertropical belt able to monitor equatorial orbits below approximately 30°;
  optical systems dedicated to highly inclined and polar orbits greater than approximately 60% at latitudes of about 50° and higher;
  optical systems at latitudes of around 40° to access intermediate inclined orbits;
  the longitudinal grid is defined based on the study of the revisit periods of each point of the globe,
  the statistical weather conditions are taken into account to obtain a maximum revisit period for the system at least equal to 2 days at 95%.

The local implementation conditions of the observation are such that each optical system installed at each node of the grid only scans areas of sky of some 10° to 40°, preferably 20° to 40°, in azimuth above 35° and of 10° to 60° in elevation, preferably 20° to 60°, around azimuths varying according to the time, season and latitude, which corresponds to a fixed right ascension belt, depending on the required performance, i.e. the population of LEO objects to be covered, the objective coverage rate and the precision to be maintained for the catalog.

To achieve this, basic optical survey systems comprise an image capture device motorized and controlled by a computerized aiming and image acquisition system.

The basic optical survey systems of the network and their means of control are designed to traverse the area to be observed at a frequency 4 times greater than the minimum transit period of the objects in the targeted population in the scanned area of the sky.

In addition, a version wherein the optical systems comprise a telescope with a 5°×5° field that is made to sweep an area of space can be envisaged within the context of the disclosed embodiment.

To determine the orbits of the objects, an initial detection of the objects in LEO is realized by measuring the position time series of objects traversing the scanned areas.

This is achieved by short integration on a fixed field, as discussed above, with a minimum of 3 measurement points for each object traversing the scanned area, and a determination of the object's positions in relation to the stars within the field of view is performed, these stars being referenced at the local aiming computer system or at an additional computer system possibly located remotely at the command center for all the network's tracking systems and comprising a map of the sky.

Possibly, the orbits are then determined precisely by utilizing a dedicated tracking system, such as described above, that uses as input data the designations of the basic optical system previously described.

In this context, an algorithm inspired by "startrackers" is used, making it possible to determine the position of the orbital object in each image captured by the telescope, either in right ascension and declination, or in azimuth and elevation, by a relative measurement of its position in the image compared to the position of the stars, known absolutely and very precisely in the system, which includes a catalog (such as the Hiparcos catalog, for example).

The general principle of the image processing performed by image processing software is as follows:
locating stars in each image by analyzing known patterns, based on the knowledge of the rough axis of observation;
locating bright elements that are not stars;
tracking the bright elements that are not stars in two successive images to discriminate the orbital objects from the noise in the image;
determining for each image the coordinates of the identified orbital objects by measuring their position (central pixel) relative to the stars' positions.

For this determination, 5 known stars are used even though, in theory, 3 stars are enough; but in this way the precision and reliability of the calculations are improved.

Lastly, the measured position is date-stamped with the date of the image capture.

The grid and nodes where the optical systems are to be located need to be defined so as to position the optical systems.

The analysis of the visibility conditions of LEO objects from the ground defines preferred latitudes according to the type of orbit.

These latitudes are typically for a belt in right ascension, moving by 1° per day to compensate for the Earth's rotation around the Sun, centered on a right ascension providing the lowest possible illumination phase angle, depending on the objects' altitude.

In the context of positioning the optical systems in latitude, the following facts in particular are taken into account:
equatorial orbits below approximately 30° of inclination can only be accessed by optical systems close to the intertropical belt.
highly inclined and polar orbits greater than approximately 60° can only be accessed from latitudes of around 60° and higher.
intermediate inclined orbits can be accessed from latitudes of around 45°.

As regards the visibility of objects in longitude, the disclosed embodiment also consists of monitoring the areas of the sky where there will be the highest probability of detecting objects.

These areas thus meet the following criteria:
the elevation is higher than 30°, in order to limit the absorption of the light rays by the atmosphere,
the monitoring is performed at night for the telescope, but for objects illuminated by the sun, so as to maximize the signal-to-noise ratio,
the phase angle of the objects to be detected is chosen to be less than 45°.

These criteria make it possible to define a mean direction around which the objects on an orbit family have a phase angle less than 45°. The phase angle depending on the position of the sun relative to the Earth, of the object in the local sky and on the local time, this direction changes with the rotation of the Earth, and consequently with the local time.

It should also be noted that, the apparent angular velocity of satellites in LEO being less at low elevation than at zenith, sensitivity is lowest at the zenith (excluding the effect of the atmosphere) for a given exposure time.

Figure 1:
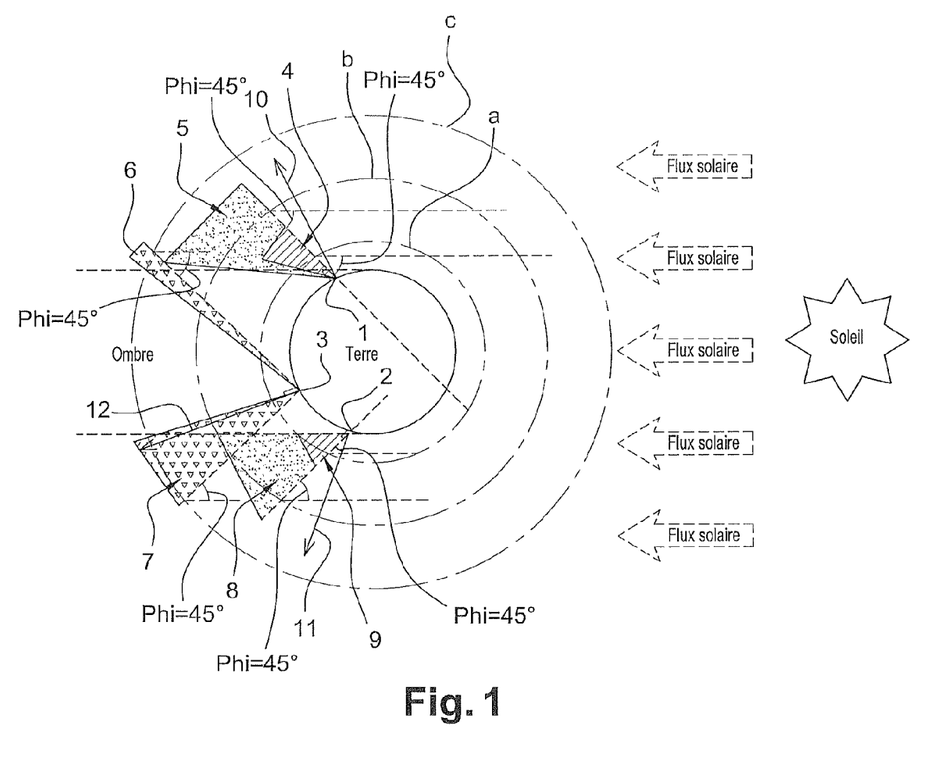
FIG. 1: an example of installation of optical systems depending on the latitude.

FIG. 1 illustrates the observation areas, which are defined in this way; it represents a latitudinal cross-section of the Earth (along a parallel) for which three sites 1, 2, 3, which are remote in longitude, and three orbits a, b, c have been represented.

In this case, the visibility areas are in relation to the solar flux; area 4 for site 1 and orbit a, area 5 for site 1 and orbit b, areas 6 and 7 for site 3, these areas being separated by the area of the Earth's shadow, areas 6 and 7 covering the orbits a, b and c, areas 8 and 9 for site 2, zone 8 making it possible to detect the objects on orbit b and area 9 the objects on orbit a.

It can be seen that the visibility areas for sites 1 and 2 are offset from the local zeniths 10 and 11, whereas for site 3, the local zenith 12 is in the visibility area 7.

The analysis of the revisit periods at every point on the globe, taking into account these conditions of visibility for the entire LEO population to be detected, demonstrates that a longitudinal grid provides at every moment a longitudinal belt wherein the visibility conditions are met;

These two analyses, in longitude and latitude, make it possible to define a grid of the globe providing an effective daily cycle of the system close to 24 hours, for each type of orbit, providing both the required coverage and revisit period.

Taking the seasonal weather statistics into account makes it possible to define a necessary redundancy rate: the analysis of weather configurations reveals a strong decorrelation between the local cloud cover conditions for points separated by a few hundred km on the globe.

In this way, the addition to the longitudinal grid of nodes provides a rate of redundancy as to cover making it possible overall to ignore local weather conditions.

This leads to the real-world case below of the implementation of a network that comprises 15 sites spread over various latitudes:

Sites in continental Europe (southern Spain), Central Asia (on the sites of existing astronomical observatories), in Japan and Canada (southern part) that make it possible to focus on most objects with an inclination greater than 45°, while detecting objects in a non-SSO polar orbit.

Sites in the Pacific (Tahiti, the Marquesas Islands), Chile (ESO sites), in East Africa (Malindi), on Diego Garcia in the Indian Ocean and on the north coast of Australia make it possible to cover equatorial orbits, as well as all the other orbits (even though providing shorter observation periods for these than at higher latitudes).

Lastly, sites located at latitudes above 60° (North or South) make it possible to detect more specifically objects on SSO and polar orbits: Alaska (Poker Flat tracking station, contributing to the ESA tracking network), northern Canada, Iceland, Kiruna, Kerguelen Islands and southern Argentina.

The choice of sites in both the northern and southern hemispheres makes it possible to partly erase the seasonal effect that limits the observation possibilities.

Within the context of realizing a survey and tracking system, each station is equipped with an optical survey system and a tracking telescope.

At the survey stations, for each optical system, predefined areas of the local sky are scanned, depending on the time of day or night, corresponding to a fixed right ascension band changing by 1° per day providing optimum illumination conditions (standard phase angle <45°) depending on the latitude. In effect, for objects in LEO, visibility periods are limited to a few hours after dusk and before dawn (duration varying according to the season, latitude, inclination and altitude of the objects), corresponding to right ascension belts providing the optimum observation conditions (illumination phase angle minimized), without the object being in the Earth's shadow.

These are belts 10 to 60° wide in azimuth, average azimuth; the width of the belt varying according to the latitude, date, time and altitude of the orbit, which are located to the east and to the west, In addition, most of the objects meeting the visibility conditions traverse this azimuth belt in a strip 10 to 60° high in elevation, above 35° elevation.

FIG. 1 contains a schematic view of the areas covered depending on the longitude.

By taking into account a minimum elevation >30° to limit the atmospheric absorption and a maximum elevation to limit the apparent traveling speed, an area of sky to be preferably monitored is defined, as well as its changes depending on the time of day, the seasons and various latitudes.

As there is, for each orbit altitude, a visibility area that is more or less wide at a given time and each orbit altitude comprises disparate populations (in terms of inclination, ascending node, etc.), it is difficult to determine theoretically the ideal area of sky to be monitored. In order to limit the latter, an area in azimuth is determined by simulation, wherein the density of objects meeting the visibility conditions is respected, depending on the time and season. The simulation principle is simple: for a certain number of latitudes (e.g. 0°, 30° N, 30° S, 45° N, 45° S, 60° N, 60° S), the illumination conditions (phase angle) of each object in a reference catalog are simulated over several consecutive days and over the two seasons, by building in the relative motions of the objects and of the Earth/Sun pair. Depending on the time, the area of the local sky (azimuth and elevation) comprising the highest density of objects meeting the required illumination conditions is measured The ideal area is refined by iterations in regards of the desired grid density to be obtained.

To this end, an initial definition of the area of the sky to be monitored is performed for various latitudes; this is modeled in the simulator used to define the grid.

The accessible performance of a given network is measured; if the performance achieved is insufficient or if the configuration of the network of stations becomes too large, the area of sky to be monitored for each latitude is reevaluated by a new analysis.

This is repeated by iteration until a satisfactory compromise in terms of performance and cost is achieved.

Conventional optical systems do not provide a sufficient field of view to scan the sky within the context of this disclosed embodiment, The principle adopted in this disclosed embodiment is to have a wide field that may reach 60° by 40°.

Combining fields by adding conventional optical systems requires an unacceptable number of optical systems.

Similarly, scanning the area of sky with a set of optical systems with conventional fields raises complex problems, notably of synchronization of the systems and of parasitic motions of these systems relative to the others.

The principle of the disclosed embodiment is to utilize medium-field, high-sensitivity telescopes at the location of each optical system, with a sensor positioned thereon, these telescopes being servo-controlled together and grouped so as to operate simultaneously to provide a wide field.

The optical systems' telescopes are sized for observing small pieces of debris in the LEO layer, e.g. debris of the order of 8 to 10 cm at an altitude of 600 Km; and are thus ideally suited to observe objects with an equivalent magnitude at higher altitudes, in the MEO or GEO belts.

However, the required velocity of the mount is greater for the LEO layer.

The determination of the telescopes' parameters arrives at: a diameter of the order of 80 cm to 100 cm; a focal length of the order of 1.5 m to 2 m, this parameter not being critical; a field ideally ranging from 5° and 20° and, more specifically from 5° to about 10°, the preferred value being a field of about 10°, and in particular 8° to 12°.

In the example where the field of the telescope is of the order of 10°, for image capture a camera is used of the type with a CCD sensor at the focal plane, with about 4,000×4,000 pixels, depending on the combination of the focal length and the field. For a telescope with a 5° field, the CCD would have 2,000×2,000 pixels.

To summarize, the sensor of the telescope(s) is a CCD sensor with 1000×1000 to 6000×6000 pixels and a CCD read-out time less than or equal to 2 seconds and an exposure time of less than 100 milliseconds.

The exposure time is the result of a compromise between the signal collection and the spread of the object's signal over the pixels to optimize the signal-to-noise ratio. A good compromise is achieved with an exposure time of the order of 64 ms, spreading the signal over some ten pixels—depending on the altitude of the object.

The spectral domain is visible light and the objects to be monitored range from the LEO layer to the GEO layer with a lower magnitude of up to 13.

The detectors can be of CCD, CMOS, SCMOS or EMCCD type, but the sensor preferred for its good signal-to-noise ratio remains the back-illuminated cooled CCD sensor.

A TMA or Schmidt type telescope will be chosen. TMA telescopes are three-mirror anastigmatic (TMA) telescopes.

Figure 2:
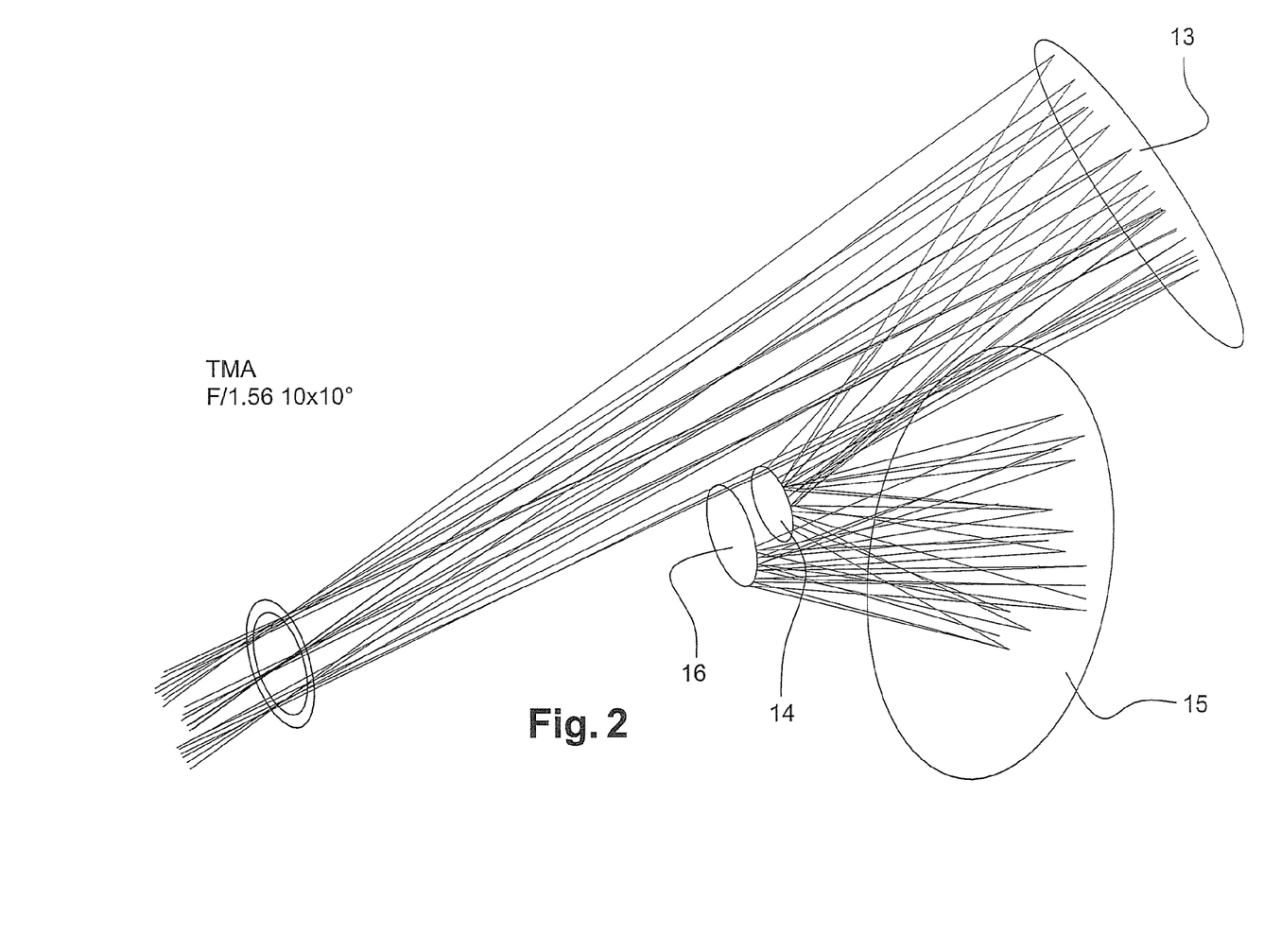
FIG. 2: a schematic diagram of a telescope suitable for the disclosed embodiment.

Such a telescope is schematized in FIG. 2 with a convergent primary mirror 13, a second divergent mirror 14, a third mirror 15 and a detector 16.

The Schmidt type telescope is a folded Schmidt-type telescope with an aperture of f/1.6 and central shadow compensation.

As an example of realization, the chosen size is a primary mirror diameter of 80 cm; this allows objects of about 10 cm in LEO to be reached, for objects at a distance of 500 km and objects of the order of 20 cm at a distance of 2,000 km for a very dark object, the dimensions being calculated for an albedo of 0.1.

In absolute terms, it is the transmission budget calculation that makes it possible to optimize the size of each telescope, as well as the entire optical and operational configuration for a required minimum detectable object size depending on altitude.

The telescopes are advantageously defined so to provide a usable field of 10° by 10°, and 6 telescopes should be grouped and servo-controlled to realize a basic survey system.

This gives a reconstituted field of 30° elevation by 20° azimuth.

For 5×5 telescopes, the reconstituted field is smaller and the scan can be larger.

Each telescope is mounted on a programmable rotary mount to scan an overall area of up to 60° elevation by 40° azimuth.

Figure 3:
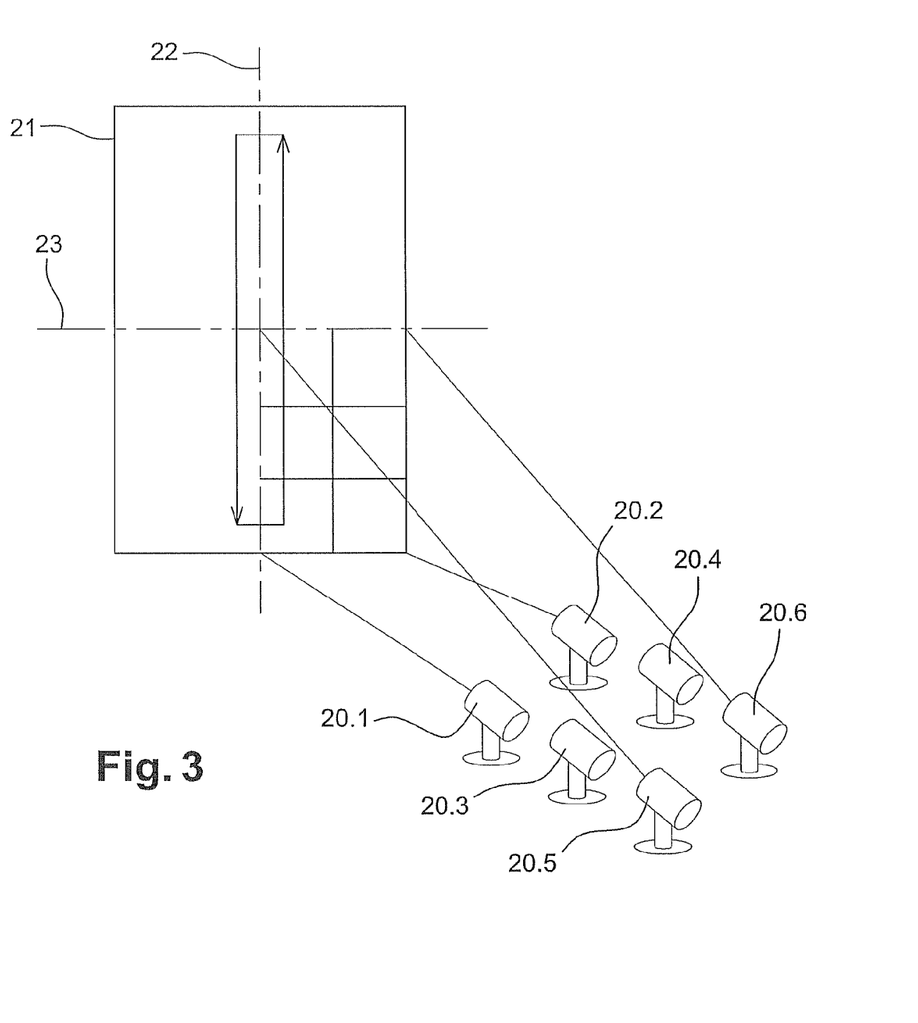
FIG. 3: a schematic representation of an optical system according to the disclosed embodiment and of the area of sky scanned by this system.

FIG. 3 represents the telescopes 20-1 to 20-6 of a basic system facing the area of sky scanned 21 in elevation 22 and in azimuth 23.

The movement velocity of the telescope is such that each object traversing the area swept is detected three times to obtain at least 3 date-stamped position measurements, ideally distributed over the object's arc of transit in the area of sky to predefine its orbit.

The images are processed with startracker-type image processing algorithms that make it possible to determine the position of the moving objects within the field, relative to the background stars, with an angular precision of the order of the IFOV (instantaneous Field Of View): 5.85 seconds of arc.

The transit periods in the area thus defined are of the order of a few minutes, depending on the orbital population to be covered; the period being shorter as the orbit is lower.

The number of image captures required to traverse the area concerned is directly related to the field of view of the wide-field optical system utilized.

The duration of image capture, and in particular the integration time, combined with the repositioning performance of the optical system (in particular its motion speed and its stabilization time) and the number of image captures affects the minimum travel duration over the area of local sky to be scanned.

A compromise must therefore be found between: this number of image captures; the maximum travel duration over the area of sky to be scanned; the characteristics of the optical system's mounts, their relocation speed including stabilization and integration time.

In order to ensure a sampling of the area of sky to be scanned limiting losses, the optical system scans this area at least 4 to 6 times faster than the shortest transit time of the targeted objects.

This constraint is added to the optimum integration time constraint to size the optical systems in terms of field of view and motion performance.

The equatorial mounts used allow a movement in azimuth from one field to the subsequent field in less than one second, including stabilization.

The telescopes of the optical system scan the sky in a belt of 10 to 60° in elevation and 10 to 40° in azimuth, around 45° elevation, centered on a right ascension near the side opposite the Sun (depending on the latitude).

The belt scanned is traversed by successive round trips. Its tropocentric coordinates change with the movement of the Sun during a single night (typically 15 arcmin per minute, to the west) and from one night to the next to compensate for the revolution of the Earth around the Sun (1° per day).

Objects located at an altitude of 500 km, observed at 45° elevation, traverse the scanned area in over 15 secs.

According to this configuration, the system can ensure that the position of each object at an altitude greater than 500 km will be measured 3 times during its transit.

Detecting objects in LEO orbit is not compatible with tracking objects because they are not known beforehand and their trajectory is even less known.

Therefore, the optical survey systems are kept still during each integration, observing a particular area of the sky matching their field of view.

The best date-stamped position measurement precision is achieved by evaluating the position of each object in LEO within the field of view relative to the stars also in the field of view.

The number of telescope to be utilized at each survey station depends on the following parameters:

Size of the area to monitor in azimuth and elevation: Az, El;

Maximum apparent angular velocity of the objects that must be guaranteed to be detected: Ws;

Size of the angular field of view of the chosen telescope configuration (the telescope maximizing the field of view while maintaining a sufficient sensitivity was sought): FOV;

CCD read-out speed: Tro;

Exposure time for each image: Ti;

Angular displacement velocity of the telescope to target another field: Td;

Measurement criterion for objects in order to guarantee their detection:

Number of successive images in a single field of view to implement effective tracking: n;

Number of image captures of a single object, distributed throughout the monitored area, required to ensure its detection and at least an initial calculation of its orbital parameters: N.

It is considered that the time of travel from one field to the other is shorter than the sensor read-out time: Td<Tro, which corresponds to the current known performance of the mounts and of the CCD (Tro=2 s corresponds to large fast sensitive matrices). In this way, field relocation is performed during the sensor read-out.

The sensor is, notably, a 15 µm, 4,096×4,096 pixel CCD camera, used in 2×2 binning ("binning" is a method of combining the charges of adjacent pixels in a CCD camera) and the field of view is 9°×9°.

The measurement frequency is limited by the camera's read-out time, here: ~2 secs i.e. a frequency of 0.5 Hz.

According to the disclosed embodiment, to determine the number of telescopes, the following calculations are performed:

$T_{champ} = n \times (T_{ro} + T_i)$: processing time of a constituted field of view;

$$T_{transit} = \frac{MIN(Az; El)}{\omega_s};$$

least favorable transit period of an object traversing the monitored area "properly" (i.e. not in the corners);

$$T_{cycle} = \frac{T_{transit}}{N+1};$$

the system must scan the area at least 4 times to ensure that 3 images of the object will be taken during its transit;

$$N_{champs} \leq \frac{T_{cycle}}{T_{champ}};$$

the conditions impose a maximum number of fields to be traversed during the object's transit time to ensure that it is seen N times;

$$Taille_{champ} \geq \frac{Az \times El}{N_{champ}};$$

determination of the minimum size of each individual field over which images will be captured;

$$N_{téléscpoes} \geq \frac{Taille_{champ}}{FOV^2};$$

this field must be constituted from a certain number of single telescopes, whose field of view FOV is calculated in this way.

If the following are used in a digital application:
n=2: 2 successive views on each field to ensure the tracking;
N=3: Minimum of 3 image captures over the entire travel across the field;
Az=60°; El=40°;
Tro=2 secs: CCD read-out time of 2 seconds;
Ti=0.1 sec: from a few milliseconds up to 100 ms exposure time;
Ws=0.52°/s: apparent angular velocity of a satellite moving in a 600 km orbit, seen at 60° elevation;
FOV=10°: telescope whose design provides a 10°×10° field of view,
N, the minimum number of telescopes, must be greater than 5.24, i.e. an optimal number of 6 telescopes of 10° for traversing an area of 60°×40°, around 60° in elevation while also ensuring the detection of objects on orbits 600 km and higher.

The scan is then a parameterized pattern, optimized based on tracking and sky coverage studies and providing a minimum of two images at the same aiming position.

The angular offset between two images of the scan is such that there is at least one field of view in one of the directions, to be optimized based on the elevation to limit overlap (depending on the results of the screening and sky coverage studies).

Scanning frequency: limited by the camera read-out time and by the mount's motion velocity.

As seen above the survey system can be completed with a tracking system whose objective is to acquire more numerous and precise position measurements, based on the designation realized by the survey system, so as to achieve the required precision of determination of the orbital parameters.

The tracking system is based on conventional telescopes, with high sensitivity and a standard field of view of the order of 1°.

These telescopes are positioned on the same sites as the optical survey systems.

The invention claimed is:

1. An optical system for surveillance systems for space surveillance comprises a matrix of N×P telescopes, each with a field greater than or equal to 5°, said telescopes being coupled to N×P image sensors whose sensitivity comprises integration times having an order of magnitude of 10 to 100 milliseconds, the telescopes being mounted on one or more motorized mounts, the telescopes being servo-controlled together and grouped so as to operate simultaneously to provide a wide field and in that the movement velocity of the telescope mounts is such that each object that goes through a swept area is detected at least three times to obtain at least 3 dated position measurements distributed over the object's arc of transit in the sky, the exposure time or integration time being defined to obtain the object's signal being spread over several pixels.

2. The optical system according to claim 1, wherein the exposure time is set to obtain a spread of the signal over some ten pixels.

3. The optical system according to claim 1, wherein said telescopes comprise a field of 5°×5° to 12°×12°.

4. The optical system according to claim 1, wherein the N×P mounts are connected to common control means able to control these mounts together in azimuth and elevation.

5. The optical system according to claim 1, wherein the telescopes have a usable field of 10° by 10°, and the system comprises N×P=3×2 telescopes so as to provide a reconstituted field of 30° elevation by 20° azimuth.

6. The optical system according to claim 1, wherein each telescope is mounted on a programmable rotary mount designed to scan a global area of up to 60° elevation by 40° azimuth.

7. The optical system according to claim 1, wherein each sensor is a CCD sensor with 1000×1000 to 6000×6000 pixels and a CCD read-out time less than or equal to 2 seconds and in that the exposure time is less than 100 milliseconds.

8. The optical system according to claim 1, wherein said telescopes are TMA-type telescopes.

9. The optical system according to claim 1, wherein said telescopes are Schmidt-type telescopes.

10. The optical system according to claim 9, wherein said telescopes are folded Schmidt-type telescopes.

11. The optical system according to claim 10, wherein said telescopes are folded Schmidt-type telescopes with an aperture of f/1.6 and central shadow compensation.

12. The optical system according to claim 1, wherein the sensors are 15 µm, 4,096×4,096 pixel CCD cameras, used in 2×2 binning.

13. The optical system according to claim 1, wherein the time of travel of the object from one field to the other is shorter than a sensor read-out time: Td<Tro, and field relocation is performed during the sensor read-out.

\* \* \* \* \*